Sept. 29, 1953     H. A. HUSSEY ET AL     2,653,884

COMPOSITE ARTICLE

Filed Nov. 9, 1950

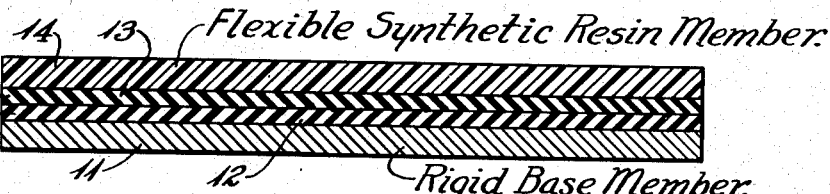

Adhesive Layer comprising a Rubbery Butadiene-Acrylonitrile Copolymer And a Vinyl Chloride-Vinylidene Chloride Copolymer.

Flexible Synthetic Resin Member.

Rigid Base Member.

Adhesive Layer comprising a Rubbery Butadiene-Acrylonitrile Copolymer, A Vinyl Chloride-Vinylidene Chloride Copolymer And a Polymer comprising from 70 to 95 per cent by weight of Vinyl Chloride, From 1/2 to 10 Per cent by weight of a Monomer selected from the Class consisting of Alpha-Beta Unsaturated Dicarboxylic Acids And Alpha-Beta Unsaturated Dicarboxylic Acid Anhydrides and from 4 to 25 per cent by weight of Vinyl Acetate.

Inventors
Harold A. Hussey
Donald D. Wright
By Robert W. Furlong
Atty.

Patented Sept. 29, 1953

2,653,884

UNITED STATES PATENT OFFICE 2,653,884

COMPOSITE ARTICLE

Harold A. Hussey, Belmont, and Donald D. Wright, Watertown, Mass., assignors to The B. F. Goodrich Company, New York, N. Y., a corporation of New York Application November 9, 1950, Serial No. 194,838

5 Claims. (Cl. 154—43)

It is an object of this invention to provide an adhesive composition which is thermosetting, permitting an article bonded therewith to be heated to moderately elevated temperatures without destroying the adhesive bond.

It is also an object of this invention to provide a laminated article having an adhesive layer therein which has excellent resistance to sunlight deterioration and which does not discolor upon exposure to sunlight.

Another object of this invention is to provide a method of securely bonding a flexible synthetic resin, such as plasticized polyvinyl chloride or vinyl chloride copolymers, to a rigid material, such as a metal composition or wood to form an integral unit.

Still another object of this invention is to provide an adhesive composition which is easily handled and non-tacky when in a dry condition.

It is also an object of this invention to provide an adhesive composition which may be employed in the form of a solution in a volatile solvent.

Still another object of this invention is to provide an adhesive composition which may be readily cured or thermoset by heating to a predetermined temperature but which is stable at lower temperatures, so as to permit storage for extended periods of time.

Other objects of this invention will be apparent from the drawing and description which follow.

The heretofore mentioned objectives are attained by preparing an adhesive composition comprising a homogeneous blend of a rubbery butadieneacrylonitrile copolymer and a vinyl chloride-vinylidene chloride copolymer. Suitable vulcanizing, accelerating, reinforcing ingredients, and fillers may be incorporated with the aforementioned copolymers to form a solid adhesive composition which may be utilized in the form of an unreinforced sheet or may be dissolved or dispersed in an appropriate liquid medium to form a cement. An excellent bond is obtained between two rigid members, such as metal or wood members, or between a rigid member and a rubbery flexible member, such as a member formed of a plasticized polyvinyl chloride copolymer, or between two rubbery flexible members by interposing an adhesive material comprising our adhesive composition between the members to be bonded and then subjecting the composite assembly to heat and pressure to vulcanize the adhesive composition, thereby forming the assembly into an integral unit.

The drawing is a view in section of a laminated article embodying this invention.

As shown in the drawing, the article includes a laminated structure comprising a rigid base member 11, for example wood or a metal such as steel or aluminum, and a layer of flexible thermoplastic material 14 bonded thereto by means of intervening layers 12 and 13 of adhesive composition.

Surface member 14 preferably comprises a preformed layer of a plasticized polymer of a monomeric material comprising predominantly a chloro-ethylene containing from one to two chlorine atoms on one only of the carbon atoms. Among such materials are polymers of vinyl chloride or vinylidene chloride or copolymers of these materials with each other or with lesser amounts of other copolymerizable materials containing a single olefinic double bond such as vinyl bromide, vinyl fluoride, vinyl acetate, vinyl propionate, vinyl butyrate, vinylidene fluoride, vinylidene chlorofluoride, dimethyl maleate, diethyl chloro-maleate, dimethyl fumarate, methyl acrylate, ethyl acrylate, methyl methacrylate, methyl alpha-chloroacrylate, ethylene, isobutylene, and the like. Of these polymers, high molecular weight polyvinyl chloride is particularly useful. Any of the usual compounding ingredients commonly employed in the plastics industry may also be present in the surface layer, such as pigments, fillers, reinforcing agents, plasticizers, stabilizers, etc.

Adhesive layer 13 in contact with surface member 14 comprises a mixture of a rubbery butadiene-acrylonitrile copolymer with a copolymer of vinyl chloride and vinylidene chloride, while adhesive layer 12 in contact with base member 11 comprises a mixture of the same two ingredients together with a polymer obtained by polymerizing together from 70 to 95 per cent by weight of vinyl chloride, from 4 to 25 per cent by weight of vinyl acetate and from ½ to 10 per cent by weight of a monomer selected from the class consisting of alpha-beta unsaturated dicarboxylic acids and alpha-beta unsaturated dicarboxylic acid anhydrides.

The rubbery vulcanizable butadiene-acrylonitrile copolymer component of our adhesive composition comprises a rubbery copolymer obtained by the polymerization of an open-chain aliphatic conjugated diene containing from four to eight carbon atoms, exemplified by butadiene-1,3; 1,4-dimethyl butadiene-1,3; 2,3-dimethyl butadiene-1,3, and the like, with acrylonitrile. The polymerization of the open-chain aliphatic conjugated diene with acrylonitrile is carried out in the usual manner using a suitable catalytic agent, such as potassium persulfate, to initiate the reaction. Preferably the rubbery butadiene-acrylonitrile copolymer component of our adhesive composition has a combined acrylonitrile content of from 10 to 45 per cent by weight based on the weight of butadiene-acrylonitrile copolymer in the adhesive composition. Most satisfactory results are obtained with a rubbery butadiene-acrylonitrile copolymer which has a combined acrylonitrile content of approximately 35 per cent by weight and has a Mooney plasticity from 80 to 100 points when tested according to the procedure described in "A. S. T. M. Standards on Rubber Products" under specification D 15–41, a minimum tensile strength of 3700 pounds per square inch at 77° F., a minimum ultimate elongation at 77° F. of 550 per cent, and a volume swell of from 12 to 20 per cent when tested according to the procedure described in Method A, of specification D 371–46T of the "A. S. T. M. Standards on Rubber Products." Appropriate fillers, softeners, vulcanizing agents, accelerators, etc. may be incorporated into the butadiene-acrylonitrile copolymer to modify its physical properties. Preferably from 0.5 to 10 per cent by weight of an appropriate vulcanizing agent, such as sulfur, is dispersed into the rubbery butadiene-acrylonitrile copolymer.

The vinyl chloride-vinylidene chloride copolymer component of our adhesive composition comprises a copolymer obtained by the polymerization of vinyl chloride with vinylidene chloride which polymerization is carried out in an aqueous dispersion in the usual manner using a suitable catalytic agent, such as benzoyl peroxide, to initiate the reaction. Preferably the vinyl chloride-vinylidene chloride copolymer has a combined vinylidene chloride content from 1 to 40 per cent by weight. Most satisfactory results are obtained with a vinyl chloride-vinylidene chloride copolymer which has a combined vinylidene chloride content from 2 to 5 per cent by weight. Fillers, modifiers, stabilizers, plasticizers, etc. conventionally incorporated in vinyl chloride-vinylidene chloride copolymer compositions may be included in the vinyl chloride-vinylidene chloride copolymer component of our adhesive composition.

To impart optimum adhesive properties to our adhesive composition, it is preferable that the composition of layer 13 should contain from 40 to 80 per cent by weight of butadiene-acrylonitrile copolymer based on the total weight of the butadiene-acrylonitrile copolymer and the vinyl chloride-vinylidene chloride copolymer in the adhesive composition.

A vinyl chloride-vinyl acetate-maleic acid tripolymer is preferably included in the adhesive composition of layer 12 which is in direct adherent contact with the structural metal or wood member 11. Preferably the vinyl chloride-vinyl acetate-maleic acid tripolymer in our adhesive composition comprises from 50 to 95 per cent by weight of the total weight of vinyl chloride-vinyl acetate-maleic acid tripolymer, butadiene-acrylonitrile copolymer and vinyl chloride-vinylidene chloride copolymer present in the adhesive composition and has a combined vinyl chloride content of from 70 to 95 per cent by weight, a combined vinyl acetate content of from 4 to 25 per cent by weight, and a combined maleic acid content of about 1 per cent.

The various components of our adhesive composition are compounded together by any process normally employed in compounding rubbery compositions, such as by milling the ingredients together on a roll mill or by mixing the ingredients in an internal mixer.

Our adhesive composition is particularly adapted to bonding together a rigid structural-metal member having a relatively high ultimate strength, such as members fabricated from aluminum, steel, stainless steel, brass and copper, and a flexible synthetic rubbery resin member, such as members formed of a plasticized polyvinyl chloride copolymer and the like.

Examples of our adhesive composition embodying this invention are illustrated by the following recipes, however, it will be understood that we do not intend to limit the scope of this invention by the following recipes:

*Example I*

| Material | Parts by Weight |
|---|---|
| Rubbery butadiene-acrylonitrile copolymer (35% by weight combined acrylonitrile content). | 150.0 |
| Vinyl chloride-vinylidene chloride copolymer (4% by weight combined vinylidene chloride content). | 50.0 |
| Dioctyl phthalate | 20.0 |
| Resinous polyester plasticizer (such as Paraplex G-40 which is comprised mainly of a polyester of adipic acid with a small amount of propylene glycol 1, 2 and is manufactured by the Resinous Products & Chemical Company). | 10.0 |
| Barium stabilizer (such as Staflex QMXA which is comprised mainly of a barium ricinoleate glyceride and is manufactured by Deecy Products Company). | 6.0 |
| Sulfur | 1.0 |
| Benzothiazyl disulfide | 1.0 |
| Total | 238.0 |

The butadiene-acrylonitrile copolymer and vinyl chloride-vinylidene chloride copolymer were blended together on a roll mill and the other ingredients were compounded into the copolymer blend in the usual manner.

*Example II*

| Material | Parts by Weight |
|---|---|
| Rubbery butadiene-acrylonitrile copolymer (18% by weight combined acrylonitrile content). | 80.0 |
| Vinyl chloride-vinylidene chloride copolymer (20% by weight combined vinylidene chloride content). | 120.0 |
| Resinous polyester plasticizer (such as Paraplex G-40 which is comprised mainly of a polyester of adipic acid with a small amount of propylene glycol 1, 2 and is manufactured by the Resinous Products & Chemical Company). | 10.0 |
| Barium stabilizer (such as Staflex QMXA which is comprised mainly of a barium ricinoleate glyceride and is manufactured by Deecy Products Company). | 6.0 |
| Dioctyl phthalate | 18.0 |
| Benzothiazyl disulfide | 1.3 |
| Sulfur | 1.2 |
| Total | 236.5 |

The composition was prepared as described in Example I.

*Example III*

| Material | Parts by Weight |
|---|---|
| Rubbery butadiene-acrylonitrile copolymer (35% by weight combined acrylonitrile content). | 2.5 |
| Vinyl chloride-vinylidene chloride copolymer (4% by weight combined vinylidene chloride content). | 7.5 |
| Vinyl chloride-vinyl acetate-maleic acid tripolymer (86:13:1). | 100.0 |
| Dioctyl phthalate | 1.0 |
| Resinous polyester plasticizer (such as Paraplex G-40 which is comprised mainly of a polyester of adipic acid with a small amount of propylene glycol 1, 2 and is manufactured by the Resinous Products & Chemical Company). | 0.5 |
| Barium stabilizer (such as Staflex QMXA which is comprised mainly of a barium ricinoleate glyceride and is manufactured by Deecy Products Company). | 0.3 |
| Sulfur | 0.1 |
| Benzothiazyl disulfide | 0.1 |
| Total | 112.0 |

The composition was prepared as described in Example I.

To facilitate the application of our adhesive composition to surfaces to be bonded together, the adhesive composition is preferably employed in the form of a solution obtained by dissolving or suspending the adhesive composition in a volatile liquid medium such as an appropriate organic solvent, for example methyl ethyl ketone or the like. The adhesive solution may be applied to the surfaces to be bonded together in a conventional manner, such as by spreading, brushing, spraying, dipping, etc. Preferably the solution comprises from 5 to 75% by weight of our adhesive composition.

A preferred method of bonding together a rigid metal member, such as a member fabricated from aluminum, steel, stainless steel, brass or copper, and a flexible synthetic resin member, such as a member comprising a plasticized polyvinyl chloride copolymer or a vinyl acetate resin and the like, is to apply a layer of our adhesive composition such as described in Example I or Example II to the face of the synthetic resin member to be bonded and a layer of our adhesive material comprising a vinyl chloride-vinyl acetate-maleic acid tripolymer such as described in Example III to the face of the metal member to be bonded. If a solvent or diluent is incorporated with the adhesive materials, the solvent or diluent is allowed to evaporate from the adhesive coatings. The coated surfaces of the members to be bonded are brought together and the assembly is subjected to heat and pressure, such as by heating the assembly for 15 minutes in a mold maintained at from 300–330° F. and at a pressure of 200 p. s. i., which forms the assembly into an integral unit. The adhesive bond formed between the metal member and the synthetic resin member may equal 75 pounds per inch width; generally the synthetic resin surface member fails prior to the separation of the bond.

The surface member may be given any desired finish by employing a suitable mold surface during the bonding step. Laminated structures consisting of flexible synthetic resin members and rigid members which have a relatively high ultimate strength bonded together with an adhesive material within the purview of this invention may be fabricated into numerous shapes by drawing, spinning, embossing etc.

Laminated articles in which our adhesive composition is utilized have excellent resistance to sunlight being capable of withstanding sunlight for prolonged periods of time without subsequent deterioration of the adhesive bond or discoloration.

An adhesive composition within the purview of this invention is relatively stable permitting the composition to be stored for long periods of time without serious deterioration occurring.

It is clear that obvious modifications and variations of this invention may be made without departing from the spirit and scope of this invention as defined in the appended claims.

We claim:

1. A composite structure comprising a rigid structural-metal member, a flexible member opposing said structular-metal member in a generally face-to-face relationship, said flexible member comprising a plasticized polymer of a monomeric material comprising predominantly a chloroethylene containing from one to two chlorine atoms on one only of the carbon atoms, a flexible resilient adhesive layer interposed between said structural-metal member and said flexible member and in direct adherent contact with the inner face of said flexible member, said adhesive layer comprising a vulcanized rubbery butadiene-acrylonitrile copolymer having a combined acrylonitrile content of from 10 to 45 per cent by weight and a vinyl chloride-vinylidene chloride copolymer, and a second flexible resilient adhesive layer interposed between said structural-metal member and the first said adhesive layer and in direct adherent contact with their opposing faces, said second adhesive layer comprising a vulcanized rubbery butadiene-acrylonitrile copolymer having a combined acrylonitrile content of from 10 to 45 per cent by weight, a vinyl chloride-vinylidene chloride copolymer and a polymer comprising from 70 to 95 per cent by weight of vinyl chloride, from 4 to 25 per cent by weight of vinyl acetate and about 1 per cent by weight of maleic acid.

2. A composite structure comprising a rigid structural-metal member, a flexible member comprising plasticized polyvinyl chloride opposing said structural-metal member in a generally face-to-face relationship, a flexible resilient vulcanized adhesive layer interposed between said structural-metal member and said flexible member and in direct adherent contact with the inner face of said flexible member, said adhesive layer comprising a vulcanized rubbery butadiene-acrylonitrile copolymer having a combined acrylonitrile content of from 10 to 45 per cent by weight and a vinyl chloride-vinylidene chloride copolymer having a combined vinylidene chloride content of from 1 to 40 per cent by weight, and a second flexible resilient vulcanized adhesive layer interposed between said structural-metal member and the first said adhesive layer and in direct adherent contact with their opposing faces, said second adhesive layer comprising a vulcanized rubbery butadiene-acrylonitrile copolymer having a combined acrylonitrile content of from 10 to 45 per cent by weight, a vinyl chloride-vinylidene chloride copolymer having a combined vinylidene chloride content of from 1 to 40 per cent by weight and a polymer comprising from 70 to 95 per cent by weight of vinyl chloride, from 4 to 25 per cent by weight of vinyl acetate and about 1 per cent by weight of maleic acid.

3. A composite structure comprising a rigid structural-metal member, a flexible resilient rubbery member comprising plasticized polyvinyl chloride opposing said structural-metal member in a generally face-to-face relationship, a flexible resilient vulcanized adhesive layer interposed between said structural-metal member and said flexible member and in direct adherent contact with the inner face of said flexible member, said adhesive layer comprising a vulcanized rubbery butadiene-acrylonitrile copolymer having a combined acrylonitrile content of about 35 per cent by weight, a Mooney plasticity of from 80 to 100 points, a minimum tensile strength of 3700 pounds per square inch at 77° F., a minimum ultimate elongation of 550 per cent at 77° F. and a volume swell of from 12 to 20 per cent and a vinyl chloride-vinylidene chloride copolymer having a combined vinylidene chloride content of from 2 to 5 per cent by weight, said butadiene-acrylonitrile copolymer comprising from 40 to 80 per cent by weight of the total weight of butadiene-acrylonitrile copolymer and vinyl chloride-vinylidene chloride copolymer in said adhesive composition, and a second flexible resilient vulcanized adhesive layer interposed between said structural-metal member and the first said adhesive layer and in direct adherent contact with their opposing faces, said second adhesive layer comprising a vulcanized rubbery butadiene-acrylonitrile copolymer having a combined acrylonitrile content of from 10 to 45 per cent by weight, a vinyl chloride-vinylidene chloride copolymer having a combined vinylidene chloride content of from 1 to 40 per cent by weight and a polymer comprising from 70 to 95 per cent by weight of vinyl chloride, from 4 to 25 per cent by weight of vinyl acetate and about 1 per cent by weight of maleic acid.

4. A composite structure comprising a rigid structural-metal member, a flexible member comprising plasticized polyvinyl chloride opposing said structural-metal member in a generally face-to-face relationship, a flexible resilient vulcanized adhesive layer interposed between said structural-metal member and said flexible member and in direct adherent contact with the inner face of said synthetic rubbery resin member, said adhesive layer comprising a vulcanized rubbery butadiene-acrylonitrile copolymer having a combined acrylonitrile content of from 10 to 45 per cent by weight and a vinyl chloride-vinylidene chloride copolymer having a combined vinylidene chloride content of from 1 to 40 per cent by weight, and a second flexible resilient vulcanized adhesive layer interposed between said structural-metal member and the first said adhesive layer and in direct adherent contact with their opposing faces, said second adhesive layer comprising a vulcanized rubbery butadiene-acrylonitrile copolymer having a combined acrylonitrile content of from 10 to 45 per cent by weight, a vinyl chloride-vinylidene chloride copolymer having a combined vinylidene chloride content of from 1 to 40 per cent by weight and a tripolymer comprising from 70 to 95 per cent by weight of vinyl chloride, from 4 to 25 per cent by weight of vinyl acetate and from ½ to 10 per cent by weight of a monomer selected from the class consisting of alpha-beta unsaturated dicarboxylic acids and alpha-beta unsaturated dicarboxylic acid anhydrides, said second adhesive layer comprising from 50 to 95 per cent by weight of said tripolymer based on the total weight of said butadiene-acrylonitrile copolymer, said vinyl chloride-vinylidene chloride copolymer and said tripolymer present in said second adhesive layer and said second adhesive layer comprising from 40 to 80 per cent by weight of said butadiene-acrylonitrile copolymer based on the total weight of said butadiene-acrylonitrile copolymer and said vinyl chloride-vinylidene chloride copolymer present in said second adhesive layer.

5. A composite structure comprising a rigid structural-metal member, a flexible member opposing said structural-metal member in a generally face-to-face relationship, said flexible member comprising a plasticized polymer of monomeric material comprising predominantly a chloroethylene containing from one to two chlorine atoms on one only of the carbon atoms, a flexible resilient adhesive layer interposed between said structural-metal member and said flexible member and in direct adherent contact with the inner face of said flexible member, said adhesive layer comprising a vulcanized rubbery butadiene-acrylonitrile copolymer and a vinyl chloride-vinylidene chloride copolymer, and a second flexible resilient adhesive layer interposed between said structural-metal member and the first said adhesive layer and in direct adherent contact with their opposing faces, said second adhesive layer comprising a vulcanized rubbery butadiene-acrylonitrile copolymer, a vinyl chloride-vinylidene chloride copolymer and a polymer comprising from 70 to 95 per cent by weight of vinyl chloride, from 4 to 25 per cent by weight of vinyl acetate and from ½ to 10 per cent by weight of a monomer selected from the class consisting of alpha-beta unsaturated dicarboxylic acids and alpha-beta unsaturated dicarboxylic acid anhydrides.

HAROLD A. HUSSEY.
DONALD D. WRIGHT.

References Cited in the file of this patent

UNITED STATES PATENTS

| Number | Name | Date |
|---|---|---|
| 2,329,456 | Campbell | Sept. 14, 1943 |
| 2,330,353 | Henderson | Sept. 28, 1943 |
| 2,352,705 | Garvey et al. | July 4, 1944 |
| 2,462,029 | Perry | Feb. 15, 1949 |
| 2,476,832 | Donia | July 19, 1949 |
| 2,576,148 | Schectman | Nov. 27, 1951 |

FOREIGN PATENTS

| Number | Country | Date |
|---|---|---|
| 569,666 | Great Britain | June 4, 1945 |
| 599,937 | Great Britain | Mar. 24, 1948 |

OTHER REFERENCES

Vinylite Elastomeric Compounds Plastic Bonding, 16 page booklet published 1944 by Carbide & Carbond Chem. Corp., N. Y., pages 6, 7, 10–14.